United States Patent
Breedvelt-Schouten et al.

(10) Patent No.: US 9,729,479 B2
(45) Date of Patent: Aug. 8, 2017

(54) GENERATE AND DISPLAY CONTEXTUAL HINTS IN A MESSAGE

(71) Applicant: International Business Machines Corporation, Armonk, NY (US)

(72) Inventors: Ilse M. Breedvelt-Schouten, Manotick (CA); Jana H. Jenkins, Raleigh, NC (US); Jeffrey A. Kusnitz, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 14/714,251

(22) Filed: May 16, 2015

(65) Prior Publication Data

US 2016/0337281 A1    Nov. 17, 2016

(51) Int. Cl.
*H04L 12/58* (2006.01)
*H04M 3/42* (2006.01)
*H04W 4/14* (2009.01)

(52) U.S. Cl.
CPC ............ *H04L 51/063* (2013.01); *H04L 51/04* (2013.01); *H04M 3/42008* (2013.01); *H04W 4/14* (2013.01)

(58) Field of Classification Search
CPC ...... G06Q 10/107; G06Q 10/06; H04L 51/02; H04L 51/16; H04L 51/08; H04M 3/42008; H04W 4/14
See application file for complete search history.

(56) References Cited

U.S. PATENT DOCUMENTS

| 6,018,761 A | 1/2000 | Uomini |
| 2009/0150495 A1* | 6/2009 | Sun .................. H04L 12/58 709/206 |
| 2010/0042910 A1 | 2/2010 | Manolescu et al. |
| 2012/0095997 A1 | 4/2012 | Nice et al. |
| 2013/0124643 A1* | 5/2013 | DeLuca .............. G06Q 10/107 709/206 |

(Continued)

OTHER PUBLICATIONS

Anonymously; "An environment-aware online application (social network, chat) based on face classification"; An IP.com Prior Art Database Technical Disclosure; http://ip.com/IPCOM/000228253; Jun. 13, 2013.

(Continued)

*Primary Examiner* — Chirag R Patel
(74) *Attorney, Agent, or Firm* — Yee & Associates, P.C.; Nicholas Bowman

(57) ABSTRACT

In providing contextual hints in an electronic message, a mail client receives a command to create a reply message to an original electronic message with original text. Topic(s) that summarize context(s) in the original text are determined and displayed in a body of the reply message as temporary text. The mail client receives response text corresponding to the topics entered into the body of the reply message. When displayed, the topics function as contextual hints for the original text. The user may use these contextual hints while composing the reply message, reducing the need for the user to scroll or jump to the original text in order to view the content to which the user is replying. When a command to send the reply message is received, the display of the topics is removed, and the reply message is sent with the response text and without the topics.

20 Claims, 6 Drawing Sheets

(56) References Cited

U.S. PATENT DOCUMENTS

2014/0115459 A1    4/2014  Norwood

OTHER PUBLICATIONS

Aue, A., et al.; "Natural Language Processing"; http://research.microsoft.com/en-us/groups/nlp/; [retrieved May 15, 2015].
Euler, T.; "Tailoring text using topic words: Selection and compression"; Proceedings 13th International Workshop on Database and Expert Systems Applications; DEXA 2002; pp. 215-219; IEEE Computing Society; Sep. 2002.
Gilmer, J. et al.; "Unsupervised semantic classification methods"; 2011 IEEE International Conference on Granular Computing, pp. 208-213; IEEE; Nov. 2011.
Hong, L, et al.; "Empirical Study of Topic Modeling in Twitter"; 1st Workshop on Social Media Analytics; Washington D.C.; Jul. 2010.
IBM; "A mechanism to provide contextual views in a communication client based on proximity alerts"; An IP.com Prior Art Database Technical Disclosure; http://ip.com/IPCOM/000183570; May 28, 2009.
McDowell, L., et al.; "Semantic Email"; Web Semantics: Science, Services and Agents on the World Wide Web, North America; Mar. 2011.
Riss, Uwe V., et al.; "Email in Semantic Task Management"; Conference: 2009 IEEE Conference on Commerce and Enterprise Computing, CEC 2009; Vienna, Austria; Jul. 20, 2009.

\* cited by examiner

GENERATE AND DISPLAY CONTEXTUAL HINTS IN A MESSAGE

BACKGROUND

When composing a response to an electronic message on a computer, such as a desktop or laptop, sufficient screen real estate typically exists such that the response text can be displayed on the screen at the same time as the original text being responded to. The user is able view the original text while composing the response text to guide his or her response.

However, many mobile devices often lack the screen real estate to view the original text while composing the response text. This forces the user to scroll or jump between the response area of a message and the original text in order to be reminded of the context and the points to address in the response.

SUMMARY

According to one embodiment of the present invention, in providing contextual hints in an electronic message, a mail client receives a command to create a reply message to an original electronic message with original text. Topic(s) that summarize context(s) in the original text are determined and displayed in a body of the reply message as temporary text. The mail client receives response text corresponding to the topics entered into the body of the reply message. When displayed, the topics function as contextual hints for the original text. The user may use these contextual hints while composing the reply message, reducing the need for the user to scroll or jump to the original text in order to view the content to which the user is replying. When a command to send the reply message is received, the display of the topics is removed, and the reply message is sent with the response text and without the topics.

System and computer program products corresponding to the above-summarized methods are also described and claimed herein.

DETAILED DESCRIPTION

Figure 1:
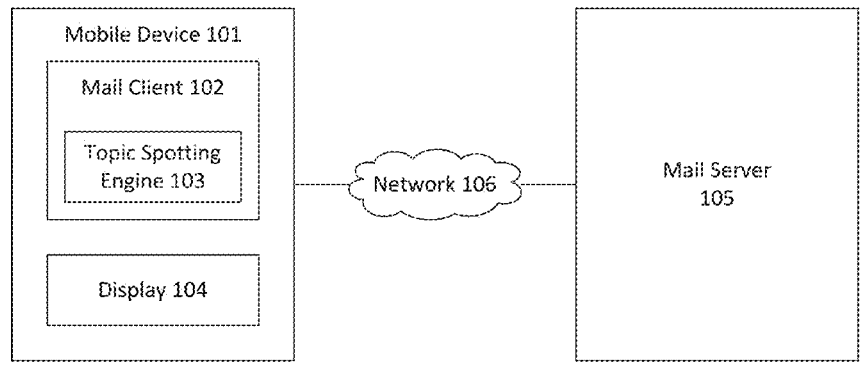
FIG. 1 illustrates a system for generating and displaying contextual hints in a message according to embodiments of the present invention.

FIG. 1 illustrates a system for generating and displaying contextual hints in a message according to embodiments of the present invention. The system includes a mobile device 101 with a mail client 102 and coupled to a display 104. The mail client 102 is an application residing at the mobile device 101 used to access and manage electronic messages. The mail client 102 includes a topic spotting engine 103, described further below. The mail client 102 communicates with a mail server 105 over a network 106. The mail server 105 is an application that receives incoming electronic messages and forwards outgoing electronic messages for delivery.

Figure 2:
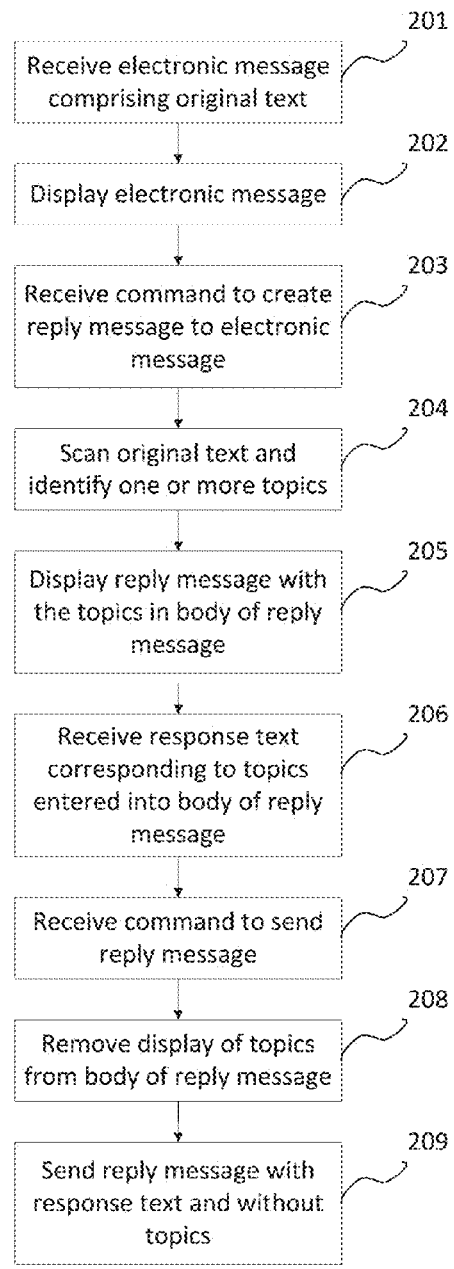
FIG. 2 is a flowchart illustrating a method for generating and displaying contextual hints in a message according to embodiments of the present invention

FIG. 2 is a flowchart illustrating a method for generating and displaying contextual hints in a message according to embodiments of the present invention. Referring to both FIGS. 1 and 2, the mail client 102 receives an electronic message from the mail server 105, with the electronic message comprising original text (201). The mail client 102 displays the electronic message on the display 104 (202). The mail client 102 receives a command to create a reply message to the electronic message (203). For example, a user may interact with a touch-enabled display 104 and touch a 'reply' graphic user interface (GUI) element on the display 104. In response to the command, the topic spotting engine 103 scans the original text of the electronic message and identifies one or more topics (204) that summarize the context(s) in the original text. Various methods of identifying topics from a scan of text may be used, such as keyword matching, semantic analysis, etc. These methods are known in the art and not described in detail here. In one embodiment, each block of original text is scanned as a unit, and one or more topics are identified for each block. Once the topics are identified, the mail client 102 displays the topics in the body of the reply message as temporary text (205). In this embodiment, the topics are displayed as "ghost text", such as with a lighter coloring than the response text and/or as semi-translucent text. Other manners of displaying the topics to distinguish the topics from the response text may be used without departing from the spirit and scope of the present invention. The mail client 102 may be configured to accept commands from the user to reorganize the topics displayed, such as by selecting topic(s) to remove, join, etc. A prompt may be displayed for the user to confirm or deny one or more of the topics as appropriate. Constraints on the display of the topics may be configured, such as a maximum length, font, size, etc. The mail client 102 receives the response text corresponding to the topics entered into the body of the reply message (206). The mail client 102 may also be configured to remove the display of a topic once response text corresponding to the topic is received. When a command to send the reply message is received (207), the mail client 102 removes the display of the topics from the body of the reply message (208) and sends the reply message with the response text and without the topics (209). When displayed in the body of the reply message, the topics function as contextual hints for the original text. The user may use these contextual hints while composing the reply message, reducing the need for the user to scroll or jump to the original text in order to view the content to which the user is replying.

Figure 3A:
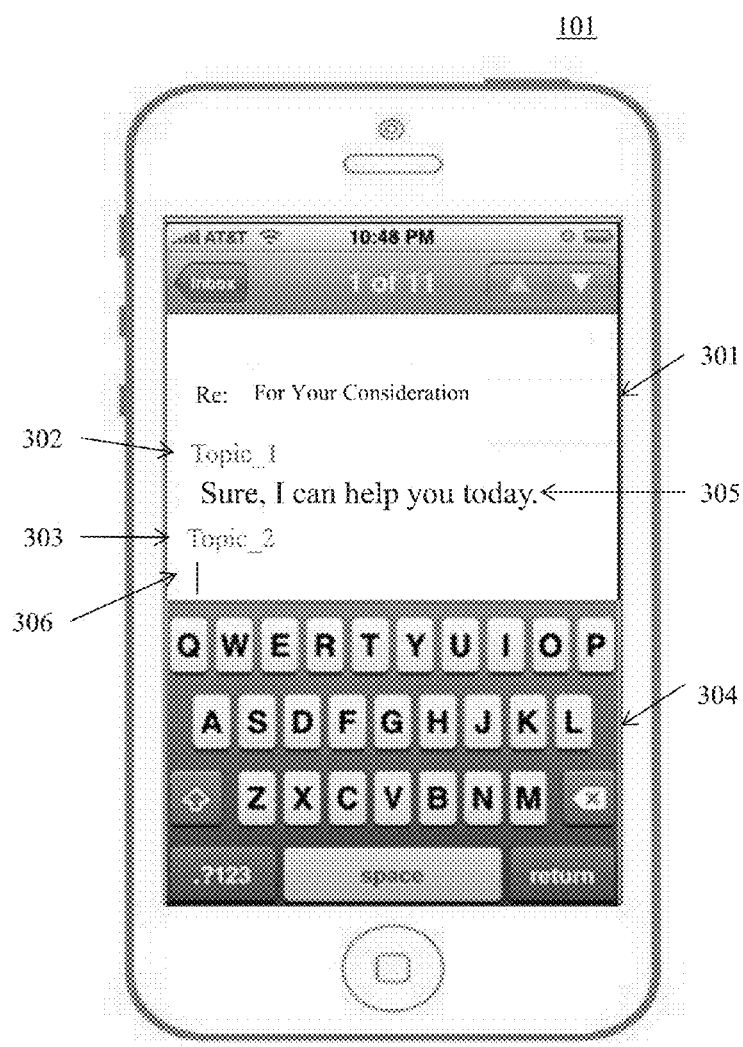
FIG. 3A illustrates an example display of contextual hints in the body of a reply message according to embodiments of the present invention.
Figure 3B:
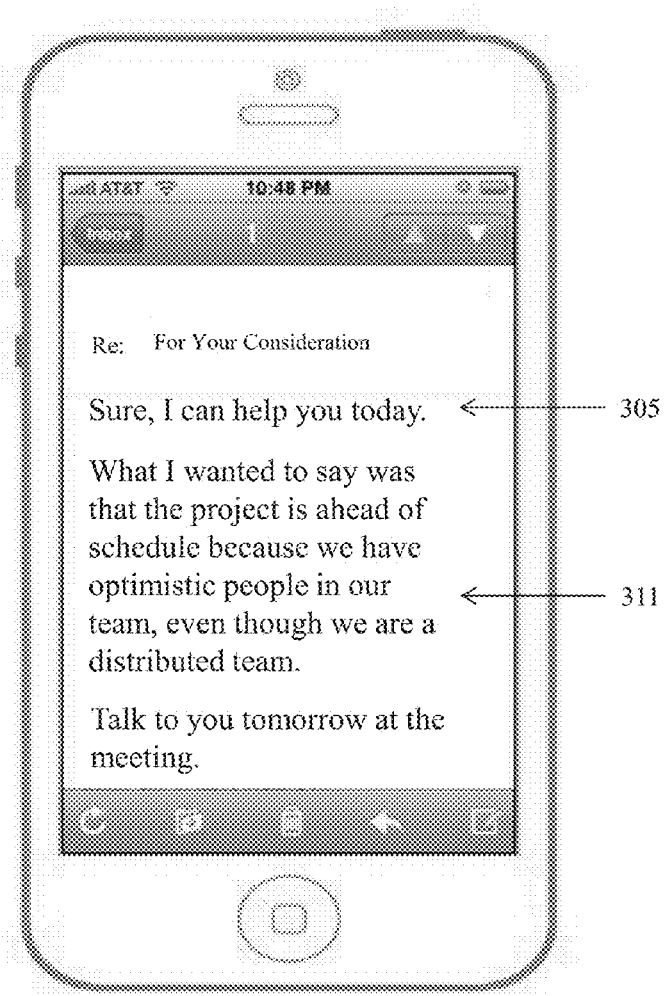
FIG. 3B illustrates an example display of the reply message as received by a recipient according to embodiments of the present invention.

FIG. 3A illustrates an example display of contextual hints in the body of a reply message according to embodiments of the present invention. Assume here that Topic_1 and Topic_2 are topics identified from a scan of the original text of an electronic message. A first ghost text 302 ("Topic_1") and a second ghost text 303 ("Topic_2") are displayed in the body 301 of the reply message. A user, using the displayed keyboard 304, enters the response text 305 "(Sure, I can help you today.")" corresponding to Topic_1 302 into the reply message. In this example, the ghost texts 302-303 are displayed as grey text and with a space after each. The user may enter the response text 305 corresponding to the first ghost text 302 in the space after the first ghost text 302. The user may then enter response text corresponding to the second ghost text 303 in the space after the second ghost text 303. (FIG. 3A illustrates a cursor 306 placed in the space after the second ghost text 303, prior to the corresponding response text being entered.) Note that the original text of the electronic message is not visible in the reply message window. To view the original text, the user would be required to scroll or jump to the original text of the electronic message, and then scroll or jump back to the body of the reply message to enter the response text. However, because the ghost texts 302-303 are displayed in the body of the reply message, the user need not move away from the reply message to be reminded of the contexts of the original text. Once the mail client 102 receives a command to send the reply message, the mail client 102 removes the display of the first and second ghost texts 302-303 and sends the reply message with the response texts and without the ghost texts 302-303. FIG. 3B illustrates an example display of the reply message as received by a recipient according to embodiments of the present invention. The response text 305 that corresponded to the first ghost text 302 and a response text 311 (not shown in FIG. 3A) that corresponded to the second ghost text 303 are in the body of the reply message, but the first and second ghost texts 302-303 are not included.

Figure 4:
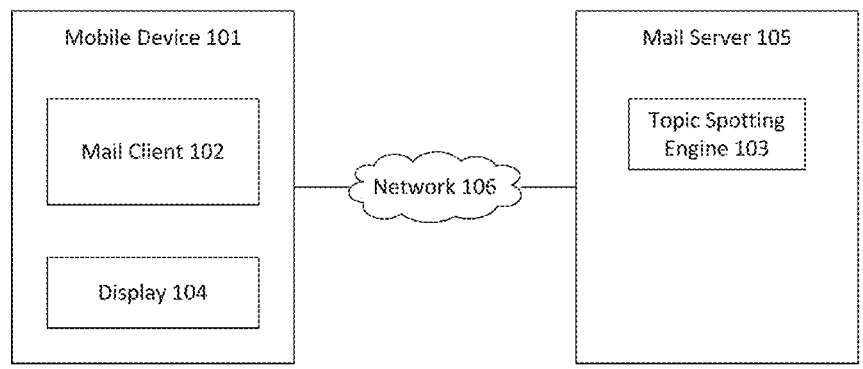
FIG. 4 illustrates an alternative system for generating and displaying contextual hints in a message according to embodiments of the present invention.
Figure 5:
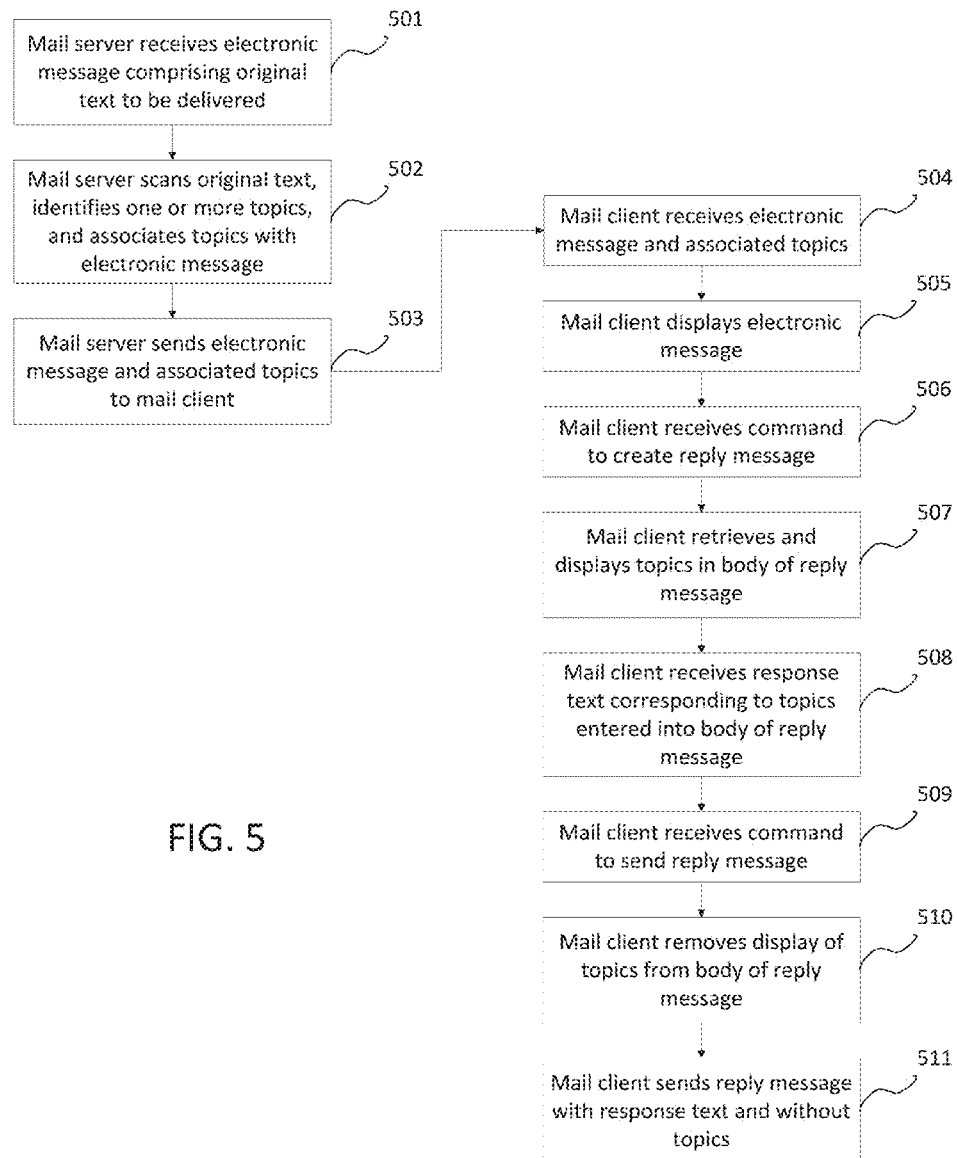
FIG. 5 is a flowchart illustrating an alternative method for generating and displaying contextual hints in a message according to embodiments of the present invention.

FIG. 4 illustrates an alternative system for generating and displaying contextual hints in a message according to embodiments of the present invention. The alternative system includes the mobile device 101 with the mail client 102 and coupled to the display 104. The mail client 102 communicates with a mail server 105 over a network 106. In this embodiment, the topic spotting engine 103 resides at the mail server 105. FIG. 5 is a flowchart illustrating an alternative method for generating and displaying contextual hints in a message according to embodiments of the present invention. Referring to both FIGS. 4 and 5, the mail server 105 receives an electronic message, comprising original text, to be delivered (501). The topic spotting engine 103 at the mail server 105 scans the original text of the electronic message, identifies one or more topics, and associates the topics with the electronic message (502). For example, the topics may be associated with the electronic message by including the topics in the electronic message's metadata. The mail server 105 then sends the electronic message and its associated topics to the mail client 102 (503). After the mail client 102 receives the electronic message and its associated topics (504), the mail client 102 displays the electronic message on the display 104 (505). When the mail client 102 receives a command to create a reply message to the electronic message (506), the mail client 102 retrieves the topics associated with the electronic message and displays the topics in the body of the reply message as temporary text (507). The mail client 102 receives the response text corresponding to the topics entered into the body of the reply message (508). When a command to send the reply message is received (509), the mail client 102 removes the display of the topics from the body of the reply message (510) and sends the reply message with the response text and without the topics (511).

Figure 6:
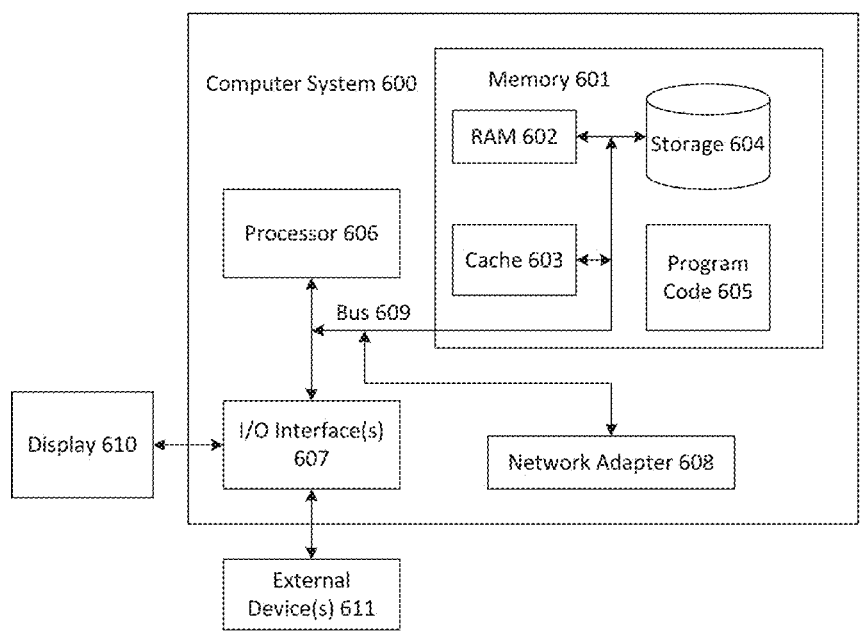
FIG. 6 illustrates a computer system according to embodiments of the present invention.

The mobile device 101 and/or the mail server 105 may be a computer system, as illustrated in FIG. 6, according to embodiments of the present invention. The computer system 600 is operationally coupled to a processor or processing units 606, a memory 601, and a bus 609 that couples various system components, including the memory 601 to the processor 606. The bus 609 represents one or more of any of several types of bus structure, including a memory bus or memory controller, a peripheral bus, an accelerated graphics port, and a processor or local bus using any of a variety of bus architectures. The memory 601 may include computer readable media in the form of volatile memory, such as random access memory (RAM) 602 or cache memory 603, or non-volatile storage media 604. The memory 601 may include at least one program product having a set of at least one program code module 605 that are configured to carry out the functions of embodiment of the present invention when executed by the processor 606. The computer system 600 may also communicate with one or more external devices 611, such as a display 610, via I/O interfaces 607. The computer system 600 may communicate with one or more networks via network adapter 608.

Although embodiments of the present invention are described above in the context of a mobile device, the present invention may be used with any device that lacks display real estate to simultaneously display both the original text and the reply message. In addition to electronic messages accessible or managed by a mail client, embodiments of the present invention may also be used with other types of messages and message applications, such as messages viewed through a web browser, where the functionalities described above may be provided through a plug-in, script, HTML, or other forms executable by the web browser. Embodiments of the present invention may also be used with social media messages viewed through a social media application, where the functionalities described above may be provided as part of the social media application.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention has been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing contextual hints in an electronic message, comprising:
   receiving a command to create a reply message to an original electronic message, the original electronic message comprising original text;
   determining one or more topics in the original text, the one or more topics summarizing one or more contexts in the original text;
   displaying the reply message with the one or more topics as contextual hints for the original text displayed as temporary text in a body of the reply message;
   receiving response text into the body of the reply message, corresponding to the one or more topics displayed as temporary text in the body of the reply message, from a user using the contextual hints while composing the reply message;
   receiving a command to send the reply message;
   removing the one or more topics displayed as temporary text from the body of the reply message in response to receiving the command to send the reply message; and
   sending the reply message with only the response text in the body of the reply message.

2. The method of claim 1, wherein the temporary text comprises ghost text in the body of the reply message.

3. The method of claim 1, wherein the determining of the one or more topics in the original text comprises:
   scanning the original text; and identifying the one or more topics in the original text using an analysis including at least one of keyword matching and semantic analysis.

4. The method of claim 1, wherein the determining of the one or more topics in the original text comprises:
receiving the one or more topics in metadata of the original electronic message.

5. The method of claim 1, wherein the receiving of the response text into the body of the reply message, corresponding to the one or more topics displayed as the temporary text in the body of the reply message, from the user using the contextual hints while composing the reply message, comprises:
receiving a given response text corresponding to a given topic of the one or more topics; and
responsive to receiving the given response text, removing the display of the given topic displayed as the temporary text from the body of the reply message.

6. The method of claim 1, wherein the displaying of the reply message with the one or more topics displayed as temporary text in the body of the reply message, comprises:
receiving one or more commands to reorganize the display of the one or more topics; and
reorganizing the display of the one or more topics according to the one or more commands to reorganize.

7. The method of claim 1, wherein the displaying of the reply message with the one or more topics as the temporary text in the body of the reply message comprises:
displaying the temporary text according to pre-configured parameters comprising one or more of a maximum length; a font; and a size.

8. The method of claim 1, wherein the displaying of the reply message with the one or more topics as the temporary text in the body of the reply message comprises:
displaying a prompt for confirmation for the one or more topics as appropriate for the original text.

9. A computer program product for providing contextual hints in an electronic message, the computer program product comprising a computer readable storage medium having program instructions embodied therewith, the program instructions when executed by a processor direct the processor to perform a method comprising:
receiving a command to create a reply message to an original electronic message, the original electronic message comprising original text;
determining one or more topics in the original text, the one or more topics summarizing one or more contexts in the original text;
displaying the reply message with the one or more topics as contextual hints for the original text displayed as temporary text in a body of the reply message;
receiving response text into the body of the reply message, corresponding to the one or more topics displayed as temporary text in the body of the reply message, from a user using the contextual hints while composing the reply message;
receiving a command to send the reply message;
removing the one or more topics displayed as temporary text from the body of the reply message; and
sending the reply message with only the response text in the body of the reply message.

10. The computer program product of claim 9, wherein the temporary text are displayed as ghost text in the body of the reply message.

11. The computer program product of claim 9, wherein the determining of the one or more topics in the original text comprises:
scanning the original text; and
identifying the one or more topics in the original text using an analysis including at least one of keyword matching and semantic analysis.

12. The computer program product of claim 9, wherein the determining of the one or more topics in the original text comprises:
receiving the one or more topics in metadata of the original electronic message.

13. The computer program product of claim 9, wherein the receiving of the response text into the body of the reply message, corresponding to the one or more topics displayed as the temporary text in the body of the reply message, from the user using the contextual hints while composing the reply message, comprises:
receiving a given response text corresponding to a given topic of the one or more topics; and
responsive to receiving the given response text, removing the display of the given topic displayed as the temporary text from the body of the reply message.

14. The computer program product of claim 9, wherein the displaying of the reply message with the one or more topics displayed as temporary text in the body of the reply message, comprises:
receiving one or more commands to reorganize the display of the one or more topics; and
reorganizing the display of the one or more topics according to the one or more commands to reorganize.

15. The computer program product of claim 9, wherein the displaying of the reply message with the one or more topics displayed as the temporary text in the body of the reply message comprises:
displaying the temporary text according to pre-configured parameters comprising one or more of a maximum length; a font; and a size.

16. The computer program product of claim 9, wherein the displaying of the reply message with the one or more topics as the temporary text in the body of the reply message comprises:
displaying a prompt for confirmation for the one or more topics as appropriate for the original text.

17. A system, comprising:
a processor; and
a computer readable storage medium having program instructions embodied therewith, the program instructions when executed by the processor direct the processor to perform a method comprising:
receiving a command to create a reply message to an original electronic message, the original electronic message comprising original text;
determining one or more topics in the original text, the one or more topics summarizing one or more contexts in the original text;
displaying the reply message with the one or more topics as contextual hints for the original text displayed as temporary text in a body of the reply message;
receiving response text into the body of the reply message, corresponding to the one or more topics displayed as temporary text in the body of the reply message, from a user using the contextual hints while composing the reply message;
receiving a command to send the reply message;
removing the one or more topics displayed as temporary text from the body of the reply message; and
sending the reply message with only the response text in the body of the reply message.

18. The system of claim 17, wherein the temporary text are displayed as ghost text in the body of the reply message.

19. The system of claim 17, wherein the determining of the one or more topics in the original electronic message comprises:
- receiving the one or more topics in metadata of the original electronic message.

20. The system of claim 17, wherein the displaying of the reply message with the one or more topics displayed as temporary text in the body of the reply message, comprises:
- receiving one or more commands to reorganize the display of the one or more topics; and
- reorganizing the display of the one or more topics according to the one or more commands to reorganize.

\* \* \* \* \*